(12) United States Patent
Kroman et al.

(10) Patent No.: US 6,260,965 B1
(45) Date of Patent: Jul. 17, 2001

(54) EYEGLASS FRAME, AN EYEGLASS, AND A METHOD OF MANUFACTURING A HINGE FOR AN EYEGLASS FRAME

(75) Inventors: Flemming Kroman, Brabrand; Lars Bøjvad Jensen, Højbjerg, both of (DK)

(73) Assignee: Lindberg A/S, Abyjoj (DK)

( * ) Notice: Subject to any disclaimer, the term of this patent is extended or adjusted under 35 U.S.C. 154(b) by 0 days.

(21) Appl. No.: 09/541,789

(22) Filed: Apr. 3, 2000

Related U.S. Application Data

(63) Continuation-in-part of application No. PCT/DK98/00433, filed on Oct. 8, 1998, now abandoned.

(30) Foreign Application Priority Data

Oct. 16, 1997 (DK) .................................................. 01187/97

(51) Int. Cl.⁷ ...................................................... G02C 5/22
(52) U.S. Cl. ............................................. 351/153; 16/228
(58) Field of Search .................................... 381/153, 111, 381/140, 41; 16/228

(56) References Cited

U.S. PATENT DOCUMENTS

| 4,084,889 | 4/1978 | Vischer, Jr. . |
| 5,418,581 | 5/1995 | Conway . |
| 6,116,733 | * 9/2000 | Krumme et al. ..................... 381/153 |

FOREIGN PATENT DOCUMENTS

| 0 732 607 | 9/1996 | (EP) . |
| WO 88/02870 | 4/1988 | (WO) . |

* cited by examiner

*Primary Examiner*—Hung Xuan Dang
(74) *Attorney, Agent, or Firm*—Thomas R. Vigil

(57) ABSTRACT

An eyeglass frame comprising a frame front, a pair of temple bars and respective hinge means, adapted to provide a pivotal connection of each temple bar with the frame front. According to the invention each hinge means comprises a cooperating pair of friction members (13,15) and a spring means (13) adapted for applying balanced, radially directed biasing forces onto the cooperating pair of frictions members. Hereby any play in the hinge is eliminated and the friction is maintained. Further the invention provides an eyeglass and a method of manufacturing an eyeglass.

13 Claims, 3 Drawing Sheets

B-B

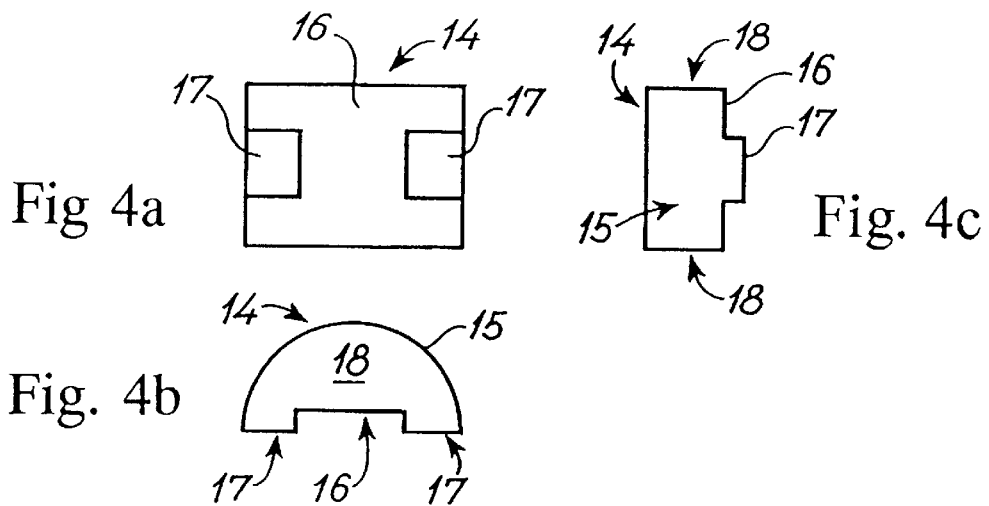
Fig 4a
Fig. 4b
Fig. 4c
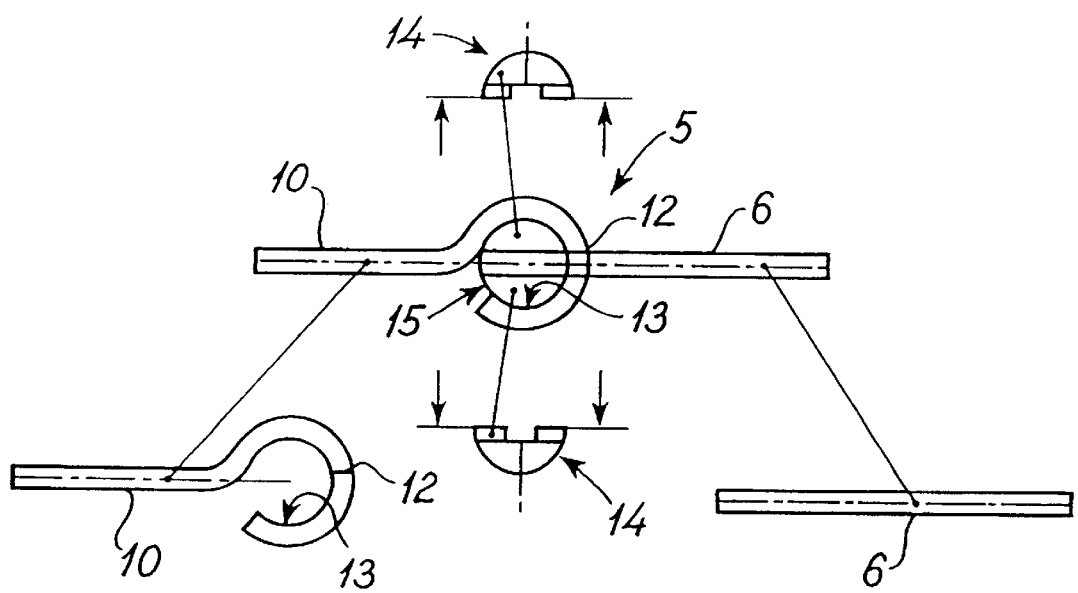
Fig. 5

EYEGLASS FRAME, AN EYEGLASS, AND A METHOD OF MANUFACTURING A HINGE FOR AN EYEGLASS FRAME

CROSS-REFERENCE TO RELATED APPLICATIONS

This is a continuation-in-part of International Patent Application PCT/DK98/00433 with an international filing date of Oct. 8, 1998, now abandoned. This application is based on application No. 1187/97 filed in Denmark on Oct. 16, 1997, the contents of which are incorporated hereinto by reference.

BACKGROUND OF THE INVENTION

1. Field of the Invention

The present invention relates to an eyeglass frame, an eyeglass, and a method of manufacturing an eyeglass frame. More specifically the invention relates to an eyeglass frame comprising a pair of temple bars pivotally connected with a frame front of the eyeglass frame. In particular the invention relates to eyeglass frames comprising hinge means fitted with friction members.

As used herein the term eyeglass relates to the well known accessory which substantially comprises two lenses of glass or of other refractive or tinted, transparent material intended to be worn in front of the eyes of the user enabling him to obtain a corrected or a darkened view through the glasses, and a form of spectacle frame arranged to keep the lenses or glasses expediently fixed in the preferred position of use, where the user can look straight forward with both eyes and with parallel lines of sight through the respective lenses.

It is well known to provide such eyeglass frames with a frame front for holding the glasses and with a pair of temple bars for supporting the frame, which temple bars are connected to the frame front by means of hinges so as to allow the eyeglass to be folded up when not in use.

Even though a variety of eyeglasses are available, development is still taking place in order to find new solutions which might gain market shares, e.g. by offering particular features or cost benefits or through offering new aesthetic features.

2. Description of the Prior Art

U.S. Pat. No. 5,325,132 describes an eyeglass frame comprising a hinge with an eyelet on the temple bar for insertion between a pair of eyelets on the frame front and for fixation with a hinge pivot. The patent teaches a solution comprising a coil spring for axial biasing of the hinge in connection with the hinge pivot in order to ensure a firm hold of the temple bar. The hinge part is relatively bulky and implies a relatively delicate shaping and assembly of several different components.

U.S. Pat. No. 4,084,889 shows an eyeglass frame wherein a pair of coaxial hinge pivots on each one of the temple bars engage in respective openings in eyelets on the frame front of the eyeglass frame, and wherein a respective blade spring imparts a transverse bias force onto the hinge pivots of each one of the temple bars. The purpose of this bias force is to counteract spurious movements of the temple bar when in other positions than fully opened. A solution of this kind is considered complicated to manufacture and to assemble. With this solution the hinge pivots are subjected to loading and local wear in one side. The friction retention of the temple bar by means of the blade spring will hardly be able to completely avoid noticeable play. This play will likely vary dependent on the manufacturing tolerances and wear.

SUMMARY OF THE INVENTION

The invention, in a first aspect, provides an eyeglass frame comprising a frame front, a pair of temple bars and a pair of hinge means, each of said hinge means being adapted to provide a pivotal connection of a respective temple bar with said frame front, each hinge means comprising a pivot and a barrel with an axial slit, adapted for pivotal cooperation, said barrel comprising resilient spring means, adapted for urging said barrel and said pivot into frictional interaction by applying radial biasing forces onto at least part of said pivot, and by said pivot comprising a pintie core and a pivot member, said pivot member comprising at least two pivot inserts, which pivot inserts are adapted to be assembled about said pintle core into a service position in which they provide a consolidated pivot exterior surface, effectively providing a generally cylindrical outer surface.

This eyeglass frame offers a friction retention of the temple bars in all positions without localized wear of the hinge means by the biasing forces relied on for providing the friction. The radial biasing on the pivot contributes to eliminate any sense of play in the hinge means proper.

According to the invention, the hinge means comprises an axially slit barrel of a resilient material. The barrel provides a generally cylindrical component, suitable for cooperating with the pivot onto which the barrel applies an inward bias.

In other embodiments, the barrel could provide the pivot in which case the barrel would be received in a sleeve inside which the barrel would be outwardly biased. In either case, the slit barrel will adapt its effective diameter within a suitable range, as appropriate, while still providing a generally cylindrical component.

The barrel ensures that radially directed forces are distributed over a range of directions around the circumference in a way so as ensure a completely balanced result of the forces, and to prevent play in the hinge means due to the ability of the resilient spring means to take up any mismatch as might in practice occur due to manufacturing tolerances and wear.

Preferably, the hinge means comprises a pivot member received in rotatable fashion by the slit barrel. This makes optimum use of the materials in terms of reducing the size of the hinge, as the resilient component, which typically will comprise a component of a small thickness, is located peripherally.

In expedient embodiments the pivot member divided by a substantially axial section surface into at least two pivot inserts. These pivot inserts may be expediently kept together by the radial biasing forces, and the two pivot inserts may optionally be provided with mating protrusions adapted for cooperation with the adjacent part of the eyeglass frame. By arranging the parts in this way and by utilizing the resilient barrel for securing the constituent parts, an easy assembly and an effective securing are obtained without any need for further fixation components.

In an expedient embodiment, the barrel comprises a strip extension, which extension has been wrapped to provide the barrel in the form of a sleeve with an axial slit.

This provides a solution which offers an attractive appearance while permitting a simple method of manufacturing and assembly.

The pivot member may comprise a substantially cylindrical outer surface, and the barrel may comprise a corresponding cylindrical inner surface only broken by the slit. However, the invention may also be implemented in other ways, e.g. with an oval shape of the pivot member and a corresponding shape of the barrel, with the purpose of securing different degrees of friction resistance in different angles, or optionally with the purpose of utilizing the spring force of the barrel for biasing the temple bar to swing towards a particular direction.

The invention, in a second aspect, provides an eyeglass comprising an eyeglass frame front, a pair of glasses, mounted by said frame front, a pair of temple bars and a pair of hinge means, each of said hinge means being adapted to provide a pivotal connection of a respective temple bar with said frame front, each hinge means comprising a pivot and a barrel with an axial slit, adapted for pivotal cooperation, said barrel comprising resilient spring means, adapted for urging parts of said barrel into frictional interaction with said pivot by applying radial biasing forces onto at least part of said pivot.

This provides an eyeglass which may be manufactured by a simple set of operations with a minimum of different components, and which has an aesthetically very agreeable appearance.

The invention, in a third aspect, provides a method of manufacturing a hinge for linking a temple bar to a front.

The invention, in a third aspect, provides a method of manufacturing a hinge for linking a temple bar to a front of an eyeglass frame, said hinge comprising a first hinge part connected to one of said temple bar or said front and a second hinge part connected to the other one of said temple bar or said front, comprising the steps of providing a sheet of resilient material, providing from said sheet a plate with a plate extension, wrapping said plate extension into the shape of a barrel with an axial slit, which barrel provides said first hinge part, providing a second hinge part including a pintle core, placing said barrel in surrounding relation with said pintle core, resiliently expanding said barrel and introducing a friction member between said pintle core and said barrel, and relieving said barrel to allow it to clasp about said friction member and said pintle core.

With this method it is possible to manufacture an eyeglass frame in a very simple manner, with a minimum of different components and with a result fulfilling use requirements as well as aesthetic requirements.

BRIEF DESCRIPTION OF THE DRAWINGS

Further features and advantages of the invention will appear in further detail from the description of preferred embodiments given below with reference to the drawings in which FIGS. 4a, 4b and 4c shows a pivot insert for the eyeglass according to the invention, FIG. 4a showing a front view, FIG. 4b showing a top plan view, and FIG. 4c showing a side view, and FIG. 5 is an exploded view of a section of the eyeglass frame according to the invention around a hinge in an assembled state and showing also the constituent items in an exploded view.

BEST MODE FOR CARRYING OUT THE INVENTION

All figures are schematic and not necessarily to scale and show only details that are essential for understanding the invention, while other details are omitted. In all figures the same references are used about identical or similar items.

Figure 1:
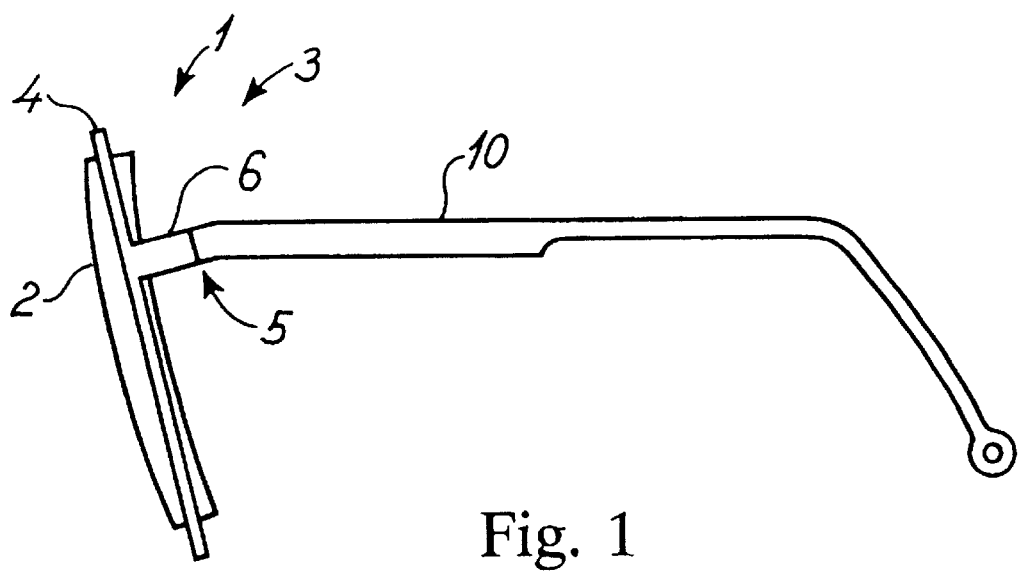
FIG. 1 is a side view of an eyeglass according to the invention.

Reference is first made to FIG. 1 showing a side view of the eyeglass according to the invention, as a whole. This eyeglass 1 mainly comprises an eyeglass frame 3, comprising a frame front 4 holding two glasses 2, to which two temple bars 10 are connected by respective hinges 5. The lateral end parts of the frame front 4, to which the hinges 5 are secured, are referred to as the front end pieces 6.

Figure 2A:
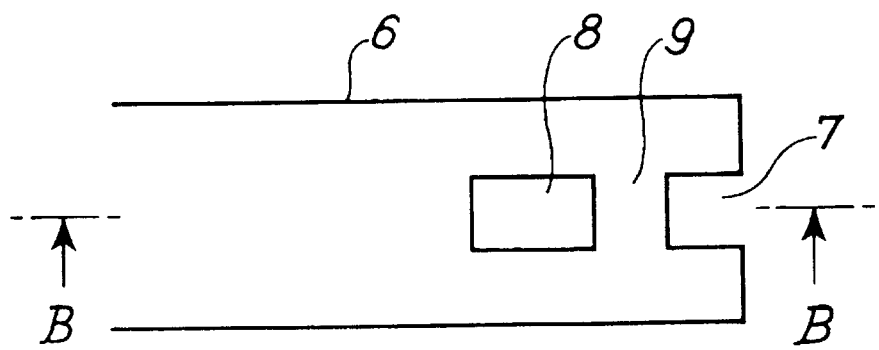
FIGS. 2a and 2b illustrates a detail of the frame front of the frame in the eyeglass according to the invention, FIG. 2a showing a plan view and FIG. 2b showing a section along the line BB in FIG. 2a, FIGS. 3a, 3b and 3c shows a detail of the temple bar in the eyeglass according the invention, FIG. 3a showing a plan view of the detail prior to wrapping, FIG. 3b showing a plan view of the same detail post wrapping, and FIG. 3c showing a section along the line CC in FIG. 3b.
Figure 2B:
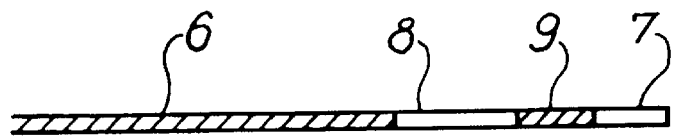

FIG. 2a shows the area adjacent the end of the front end piece prior to the assembly of the frame. In the embodiment shown in FIGS. 2a and 2b this piece comprises a strip of metal plate with parallel sides terminated in the end by a transverse cut, the end margin comprising an open notch 7 in the form of a rectangular recess. The front end piece further comprises a slot or a closed hole 8 of rectangular shape, spaced inwardly from the notch 7. The notch and the slot are in a level with each other, and the bridge or web of material which separates them is referred to as the pintle core 9.

Figure 3A:
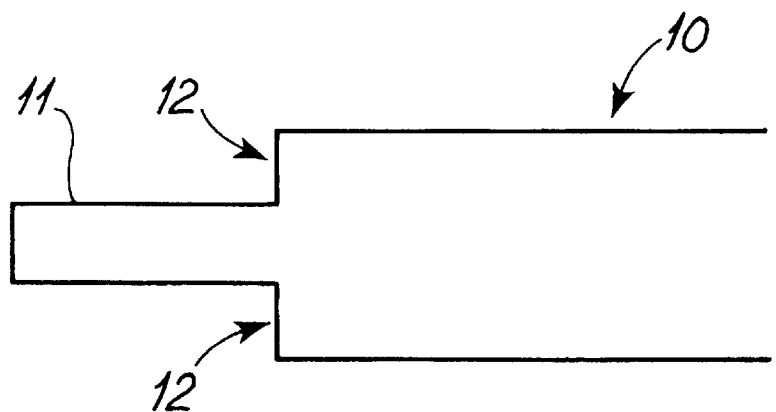
Figure 3B:
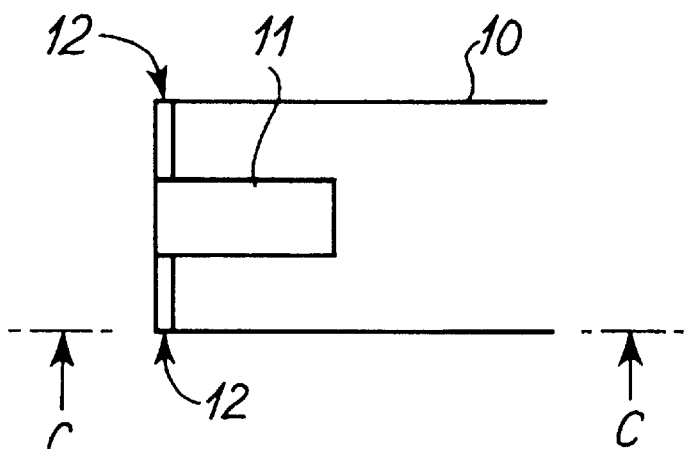
Figure 3C:
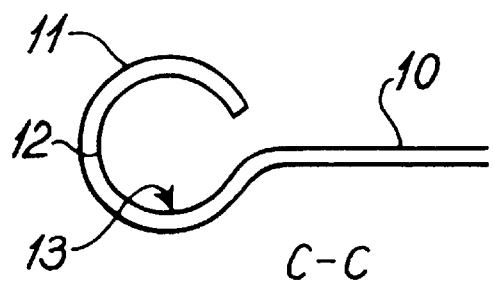

Reference is now made to FIGS. 3a, 3b and 3c showing an enlarged view of an area of a temple bar adjacent the hinge end. In the embodiment shown, the temple bar comprises a strip of metal plate which has been cut or stamped into the shape shown in FIG. 3a so that the end comprises a protruding tongue 11 with parallel edges and with a reduced width relative to the adjacent portion of the temple bar. The end of the wide portion of the strip forming a root to the tongue is referred to as the breast 12. The end of the temple bar, i.e. the tongue and part of the strip, is wrapped into the shape shown in FIGS. 3b and 3c. Thus the wrapped extension forms a slit barrel of substantially cylindrical shape, the slit extending over about 30° of the circumference.

This barrel is partially constituted by the wrapped tongue and partially by an adjacent, wrapped part of the strip. The substantially cylindrical inner surface is referred to as the barrel inner face 13. Once the wrapping has been completed, the breast 12 is substantially in a line with the lower side of the straight portion of the strip, referring to the view in FIG. 3c.

According to the invention, the front end piece and the portion of the temple bar proximate to the hinge should preferably comprise a sheet material which can be stamped or cut as indicated, and which should, as far as the temple bar is concerned, exhibit a resilient property. A sheet material of titanium alloy with a thickness of 0.7 mm has been found to meet the functional requirements.

Reference is now made to FIGS. 8a, 8b and 8c for a further description of the pivot insert 14 constituting part of the hinge of the eyeglass according to the invention.

This pivot member comprises a pair of pivot inserts 14 of identical, substantially semi-cylindrical shape. When put together, these pivot inserts 14 provide a consolidated cylindrical exterior surface, referred to as the pivot or the pintle exterior surface 15. Each pivot insert is delimited by a semi-cylindrical surface, a pair of substantially semi-circular pivot end faces 18 and by a substantially planar surface 16. The substantially planar surface comprises elevated lands 17.

In the preferred embodiment, the axis of the semi-cylindrical surface 15 is included in a plane through the top surfaces of the lands 17. The shape, the extension, and mutual spacing of the lands are adapted so that the pivot insert 14 can be registered with the end portion of the front end piece, as shown in FIG. 2a, for engagement of the lands in the open notch and the slot, respectively. The lands are symmetrical in order to register with the front end piece in either of two orientations, distinguished by a turn through 180°. This simplifies the assembly procedure.

The height of the lands compared to the base surface is preferably selected to be equivalent to half the thickness of the plate material of the front end piece.

Thus, in case of a plate thickness of 0.7 mm, a height of the lands of 0.35 mm is preferred. This will permit the placement of two pivot inserts 14 in opposing relation and sandwiching the front end piece between them. The pivot insert is made of a plastic material with suitable frictional and sliding properties for cooperating with the barrel. Suitable materials comprise polymers, and in particular polyacetal.

Reference is now made to FIG. 5 showing a view of a hinge 5 according to the invention. This hinge mainly comprises the end of the front end piece 6, the end of a temple bar 10 and two pivot inserts 14. The two pivot inserts are placed on each side of the end of the front end piece with the lands serving as mating protrusions pegged into the notch and the slot, respectively. The two semi-cylindrical pivot inserts provide together a substantially cylindrical surface contacted by the barrel inner face.

The cylindrical surface and the barrel inner face thus serve as a cooperating pair of friction members. The parts are so adapted that the barrel inner face 13 urges the pivot inserts 14 together around the pintle core in the end of the front end piece by the resilient force of the barrel. The biasing forces are fully balanced in order that the hinge ensures the mutual fixation of the two hinge parts without creating any net forces to be taken up by other components. The biasing forces ensure that the friction is maintained and that any play in the hinge is eliminated in any orientation of the parts.

The wrapped tongue 11 is threaded through the slot 8 and ensures the axial restraint of the hinge. The breast 12 by the barrel inner face cooperates with the exterior side of the front end piece 6 to form a stop for the pivoting of the hinge in the position shown in FIG. 5.

The hinge is manufactured in such manner that initially the plate parts are cut and wrapped or formed into shape. Subsequently the tongue 11 is entered through the slot so as to losely engage the hinge. A first pivot insert 14 is introduced between the tongue and a respective side of the front end piece, play in the hinge at this stage permitting lateral displacement of the temple bar relative to the front end piece to allow room for the insertion.

Then the temple bar is pivoted to the position shown in FIG. 5, and the barrel is resiliently deformed by forcing the temple bar backwards while its breast 12 bears on the exterior side of the front end piece. The barrel is expanded resiliently during this process to an extent which leaves room for the insertion of a second pivot insert 14 between the wide portion of the barrel inner face and the respective face of the front end piece opposite the first pivot insert. Once the second pivot insert is in position with the lands in the notches, the temple bar is relieved, and the barrel clasps about the pair of pivot inserts and the pintle core and keeps the pivot inserts in place.

Although specific embodiments have been explained above for the illucidation of the invention, these embodiments are in no way considered to limit the scope of the invention which may be varied in many ways by one skilled in the art within the scope of the appended claims.

We claim:

1. An eyeglass frame comprising a frame front, a pair of temple bars and hinge means for each temple bar, each one of said hinge means comprising a pivot and a barrel to provide a pivotal connection of a respective temple bar with said frame front, said pivot comprising a pintle core and a pivot member, said pivot member comprising at least two pivot inserts which are assembled about said pintle core to provide a consolidated, generally cylindrical pivot exterior surface, said barrel defining an axial slit and comprising a resilient spring means for urging at least part of said barrel into friction engagement with at least part of said pivot exterior surface.

2. The eyeglass frame according to claim 1, wherein said axial slit includes an angle within the range from 0 to 90 degrees.

3. The eyeglass frame according to claim 1, wherein each one of said pivot inserts is shaped generally as part of a cylinder sectioned along a generally axial plane.

4. The eyeglass frame according to claim 1, wherein said spring means holds together said pivot inserts.

5. The eyeglass frame according to claim 1, wherein said pivot inserts comprise protrusions and recesses for registering with said pintle core.

6. The eyeglass frame according to claim 1, wherein each of said barrels comprises a strip extension wrapped into the general shape of a cylinder with an axial slit.

7. The eyeglass frame according to claim 1, wherein at least one of said pivot and said barrel comprises a plastic member.

8. The eyeglass frame according to claim 1, wherein said frame front comprises a stamping or cutting from a sheet of plate.

9. An eyeglass comprising an eyeglass frame front, a pair of glasses, mounted by said frame front, a pair of temple bars and hinge means for each temple bar, each one of said hinge means comprising a pivot and a barrel to provide a pivotal connection of a respective temple bar with said frame front, said barrel comprising a strip extension wrapped into the shape of a cylinder with an axial slit, said strip extension comprising resilient spring means, adapted for urging at least part of said barrel into frictional engagement with said pivot.

10. The eyeglass according to claim 9, wherein said barrel defines an axial slit including an angle within the range from 0 to 90 degrees.

11. A method of manufacturing a hinge for linking a temple bar to a front of an eyeglass frame, said hinge comprising a first hinge part connected to one of said temple bar or said front and a second hinge part connected to the other one of said temple bar or said front, said method comprising the steps of selecting a sheet of resilient material, providing from said sheet a plate with a plate extension, wrapping said plate extension into the shape of a barrel with an axial slit in order to provide said first hinge part, providing a pintle core, placing said barrel in surrounding relation with said pintle core, resiliently expanding said barrel and introducing a friction member between said pintle core and said barrel, and relieving said barrel to allow it to clamp about said friction member and said pintle core, said friction member and said pintle core providing together said second hinge part.

12. The method according to claim 11, wherein the step of providing said plate with a plate extension comprises stamping or cutting said sheet.

13. The method according to claim 11, wherein the step of selecting said sheet comprises selecting a sheet of titanium.

* * * * *